United States Patent Office 2,784,078
Patented Mar. 5, 1957

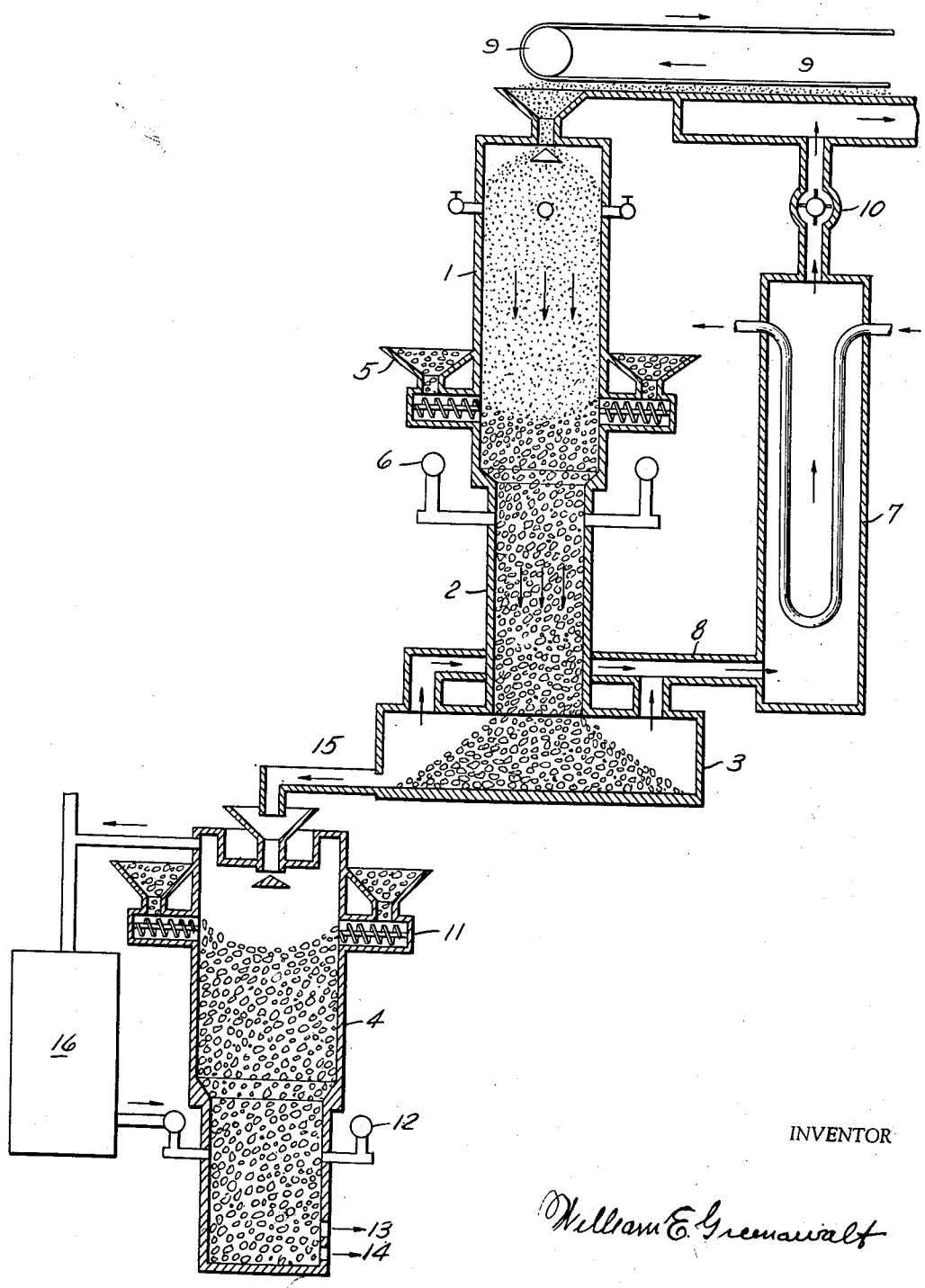

2,784,078

PROCESSES OF SMELTING FINELY DIVIDED METALLIC ORE

William E. Greenawalt, Denver, Colo.

Application August 24, 1955, Serial No. 530,227

11 Claims. (Cl. 75—40)

My invention relates to processes of smelting finely divided metallic ores, principally to iron and copper ores, such as concentrates obtained from milling ores too low grade to be profitably smelted direct.

The dust produced in the treatment of all finely divided ore, whether pertaining to smelting or roasting, presents the major issue. It is particularly acute if the ore is showered through the highly heated atmosphere of a melting furnace to melt it. In milling taconite iron ore, for example, the ore is ground to 100 or even 300 mesh to get the desired separation of the iron oxide from the silica gangue. The finely divided ore concentrate so obtained, which cannot be smelted direct in a blast furnace, is nodulized or pelletized and sintered to convert it into semi-fused lumps which are charged cold into the blast furnace, and smelted much the same as raw coarse ore. Nodulizing and sintering, of themselves, present a serious dust problem, and involve considerable expense both of installation and operation. The sintering temperature is about 2300 deg. F., and the sinter, so heated, is cooled to atmospheric temperature for transportation or smelting.

The principal object of the present invention is to eliminate the dust problem by showering the finely divided ore through the highly heated atmosphere of a melting furnace to melt it, and to coalesce the molten dust into liquid form, and then smelt the molten ore by raising the temperature of the dustless molten ore from about 2300 deg. F. to the smelting temperature of about 2600–2800 deg. F. to smelt it, and to separate the molten metal product, such as pig iron or copper matte, from the molten slag.

The process will be described more particularly to smelting finely divided iron ore concentrate, obtained from milling low grade iron ore. Referring to the accompanying drawing which represents the preferred method of operation, the mine ore which may ordinarily be ground as fine as 20 to 100 mesh, or even in some instances as fine as 300 mesh, is dried and showered in a regulated stream through the highly heated atmosphere of the melting furnace 1. The atmospheric temperature of the melting furnace may be kept reasonably high, from about 2600 to 2800 deg. F. The dried finely ground ore, when showered through the highly heated atmosphere of the melting furnace will almost instantly be converted into molten form. The mixture of melting furnace gas, and molten ore in showered or subdivided form, is then passed downwardly into and through a highly heated column or mass of solid material, such as coke, coal, rock, or lumps of coarse ore, in a coalescing chamber 2 to coalesce the molten dust particles into liquid form, and into a gas separating chamber 3 where the melting furnace gas is separated from the coalesced liquid ore.

The molten ore, freed from dust and from the melting furnace gas, is then smelted to produce pig iron and slag. The molten ore, separated from the melting furnace gas, may be cooled and transferred in lumps to a distant smelting furnace, much the same as sinter is cooled and transported. But it is evident that if the ore were charged in a molten condition into the smelting furnace 4 it would simply be necessary to raise the temperature of the molten ore from about 2300 deg. F. to the ordinary temperature of a blast furnace of about 2700–3000 deg. F. to convert the molten ore into pig iron and slag. This would make a great saving in heat requirements, and the pig iron could be shipped more conveniently and at about half the cost of cooled solidified lumps of the fused ore.

The coalescing chamber 2 will ordinarily be charged with coal or coke, to which may be added other substances if desired for particular reactions. It is fed in a slow continuous stream into the lower part of the melting furnace through the feeding mechanism 5. Air or other gaseous fluid is introduced into the coalescing chamber 2 through the tuyeres 6 to maintain the temperature safely above molten requirements. So regulated, there would be no waste of coal or coke in the separated melting furnace gas in the form of carbon monoxide.

The hot melting furnace gas, practically free from dust and carbon monoxide flows from the gas separating chamber 3 into the heat exchanger 7, through the flue 8, and from the heat exchanger into the ore drier 9. Its flow is regulated by the blower 10.

The molten ore, practically free from dust and separated from the melting furnace gas flows through the launder 15 in a regulated stream into and through the highly heated column of carbon in the smelting furnace. Coke is fed into the smelting furnace through the coke feeders 11, and air is delivered into the smelting furnace 4 through the bustle pipe and tuyeres 12. The slag flows out of the smelting furnace through the slag hole 13 and the iron through the tap hole 14. Preheated air from the heat exchanger 7 is superheated for the smelting furnace in the superheater 16, heated largely with the carbon monoxide in the exhaust smelting furnace gas.

In the ordinary operation of the process in smelting finely divided iron ore concentrate, the atmosphere of the coalescing chamber may be neutral or slightly reducing to avoid the waste of carbon, as carbon monoxide, in the melting furnace gas, which can then be eliminated from further consideration after it has passed through the heat exchanger 7 and the ore drier 9. Only enough air is introduced into the coalescing chamber 2 to keep the molten ore in a free flowing condition. Hot gas stoves, as in present iron blast furnace practice, are dispensed with.

The molten ore flows through the launder 15 into the smelting furnace at about 2300–2400 deg. F., where its temperature is raised to the best smelting efficiency, or about 2700–3000 deg. F. at the tuyeres, as in present practice, and only enough coke has to be supplied to raise the temperature of the molten ore, and to supply enough carbon for the reducing reactions. The efficiency of the chemical reactions depends largely on high temperature and the concentration of the carbon monoxide in the smelting furnace. The relatively small amount of hot gas issuing from the smelting furnace, containing considerable carbon monoxide, may be used to superheat a relatively small amount of air from the heat exchanger. The carbon dioxide in the exhaust smelting furnace gas may conveniently be converted into monoxide by injecting powdered coal into the superheater stream.

Since the reducing action of carbon in the presence of a high temperature is not dependent on the oxygen of the air, a large proportion of the exhaust smelting furnace gas issuing from the smelting furnace 4, containing largely carbon monoxide and carbon dioxide, may be mixed with fresh air and the mixture superheated and returned to the smelting furnace, and thus save an appreciable amount of carbon.

Since the primary object of the coalescing chamber is to coalesce the dust into liquid form, the coalescing chamber 2 might be filled with refractory bricks or burnt clay balls, and enough combustible injected with the air to maintain the molten ore at an easy flowing temperature, and thus dispense with all or a portion of the coke in the coalescing chamber.

There is no weight of ore to be supported in the melting furnace, and the weight of the solid material in the coalescing chamber is small as compared with that of iron ore in a regular blast furnace charge. This simplifies and cheapens the construction of the apparatus.

The process is much the same applied to copper ore as to iron ore, but the chemistry is different. Copper concentrate is usually in the form of copper-iron sulphide, which for illustration purposes, might be assumed to contain 30 percent copper, 32 percent iron, and 35 percent sulphur, per ton of ore. The sulphur may be eliminated to any extent in the oxidizing atmosphere of the melting furnace to produce the desired matte. If it is desired to eliminate 25 percent, or 500 pounds of sulphur per ton of ore, in smelting to matte, a large amount of heat would be produced, or about 2,000,000 B. t. u., which is enough to melt the ore, but not enough to complete the smelting. A small amount of carbonaceous fuel, such as petroleum, powdered coal, or natural gas, will usually be necessary to maintain the melting furnace at a temperature of about 2600-2800 deg. F. to instantly flash the sulphides and maintain the temperature of the molten ore safely above that required to avoid chilling in the coalescing chamber, and high enough to give the best separation of matte and slag in the smelting furnace. Air or fluid fuel may be added to the lump coal, coke, or other solid material in the coalescing chamber. The mixture of molten ore, matte, slag, and melting furnace gas freed from dust, flows into the gas separating chamber 3 where the melting furnace gas is separated from the molten ore. The molten ore, freed from dust and melting furnace gas, then flows into the smelting furnace, which may be a blast furnace or a reverberatory, preferably a reverberatory, to complete the smelting and to separate the molten copper matte from the molten slag. The reverberatory furnace will act both as a forehearth and a furnace to control the heat and the composition of the molten charge, to which other ingredients may be added, preferably in lump form, as desired. Only enough heat would be required in the reverberatory to effectively control the quality of the matte and to make a clean separation of matte and slag.

I claim:

1. A process of smelting finely divided metallic ore comprising, showering the ore through a highly heated atmosphere of a melting furnace to melt it, passing the mixture of finely divided molten ore and melting furnace gas downwardly into and through a highly heated permeable mass of solid material to coalesce the finely divided ore particles into liquid form, separating the molten ore from the melting furnace gas, smelting the ore separated from the melting furnace gas to produce a molten metallic product and slag, and separating the molten metallic product from the molten slag.

2. A process of smelting finely divided metallic ore comprising, showering the ore through the highly heated atmosphere of a melting furnace to melt it, passing the mixture of finely divided ore in showered form and the melting furnace gas into and through a highly heated permeable mass of solid material to coalesce the finely divided molten ore particles into liquid form, separating the molten ore from the melting furnace gas, and continuing the smelting to produce a molten metal product and slag, and separating the molten metallic product from the molten slag.

3. A process of smelting finely divided metallic ore comprising, showering the ore through the highly heated atmosphere of a melting furnace to melt it, delivering the mixture of molten ore and melting furnace gas downwardly into and through a highly heated mass of permeable solid material to coalesce the finely divided ore particles into liquid form, and separating the molten ore from the melting furnace gas.

4. A process of smelting finely divided metallic ore comprising, showering the ore through the highly heated atmosphere of a melting furnace to melt it, delivering the molten ore and melting furnace gas in showered or subdivided form into and through a highly heated mass of permeable solid material to coalesce the finely divided ore particles into liquid form, and separating the molten ore from the melting furnace gas.

5. A process of smelting finely divided metallic ore comprising, showering the ore through the highly heated atmosphere of a melting furnace to melt it, passing the melting furnace gas charged with fused dust particles into and through a highly heated mass of permeable solid material in a coalescing chamber to coalesce the fused dust particles into liquid form, separating the melting furnace gas from the fused coalesced liquid dust, smelting the fused coalesced dust to produce a molten metal product and molten slag, and separating the molten metal product from the molten slag.

6. A process of smelting finely divided iron ore concentrate obtained from milling low grade iron ore comprising, showering the ore through the highly heated atmosphere of a melting furnace to melt it, passing the mixture of finely divided ore and melting furnace gas through a mass of highly heated solid material to coalesce the finely divided molten ore particles into liquid form, separating the molten ore from the melting furnace gas, passing the molten ore through a highly heated column of carbon in a smelting furnace to complete the conversion of the iron in the ore to metallic iron, and separating the molten iron from the molten slag.

7. A process of smelting finely divided iron ore concentrate obtained from milling low grade iron ore comprising, showering the ore through the highly heated atmosphere of a melting furnace in the upper part of a vertical shaft to melt it, flowing the mixture of molten ore and melting furnace gas downwardly into and through a mass of highly heated permeable solid material in a coalescing chamber in the lower part of the vertical shaft to coalesce the finely divided molten ore particles into liquid form, separating the molten ore from the melting furnace gas, flowing the molten ore separated from the melting furnace gas and freed from dust through a highly heated column of carbon in a smelting furnace to complete the reduction of the iron in the ore to metallic iron, and separating the molten iron from the molten slag.

8. A process of smelting finely divided iron ore concentrate obtained from milling low grade iron ore comprising, showering the ore through the highly heated atmosphere of a melting furnace to melt it, passing the mixture of finely divided ore and melting furnace gas through a mass of highly heated solid material to coalesce the finely divided molten ore particles into liquid form, separating the molten ore from the melting furnace gas, flowing the molten ore separated from the melting furnace gas and freed from dust through a highly heated column of carbon in a smelting furnace to complete the reduction of the iron in the ore to metallic iron, withdrawing the waste gas containing carbon monoxide and carbon dioxide from the smelting furnace, converting the carbon dioxide in the withdrawn gas into carbon monoxide, returning the withdrawn gas to the smelting furnace, and separating the molten iron from the molten slag.

9. A process of smelting finely divided ore concentrate obtained from milling low grade metallic ore comprising, showering the ore concentrate through the highly heated atmosphere of a melting furnace in the upper part of a vertical shaft to melt it, passing the mixture of molten ore concentrate and melting furnace gas downwardly through a highly heated permeable mass of solid material in the lower part of the vertical shaft, separating the molten ore concentrate from the melting furnace gas, and continuing the smelting of the molten ore concentrate separated from the melting furnace gas, to separate the resulting molten metal product from the molten slag.

10. A process of smelting finely divided metallic ore comprising, showering the ore through the highly heated atmosphere of a melting furnace in the upper part of a vertical shaft to melt it, passing the mixture of the molten ore in showered form and the melting furnace gas downwardly through a highly heated permeable column of carbon in a coalescing chamber in the lower part of the vertical shaft to convert the finely divided molten ore particles into liquid form, injecting the carbon of the coalescing chamber into the vertical shaft intermediate the melting furnace and the coalescing chamber, and continuing the smelting to produce a molten metal product and a molten slag.

11. A process of smelting finely divided metallic ore comprising, showering the ore through the highly heated atmosphere of a melting furnace in the upper part of a vertical shaft to melt it, passing the mixture of molten ore in showered form and melting furnace gas downwardly through a highly heated permeable column of solid material in a coalescing chamber in the lower part of the vertical shaft to convert the finely divided molten ore particles into liquid form, injecting the solid coalescing material of the coalescing chamber into the vertical shaft intermediate the melting furnace and the coalescing chamber, and continuing the smelting to produce a molten metal product and a molten slag.

References Cited in the file of this patent
UNITED STATES PATENTS 2,307,459     Greenawalt _____ Jan. 5, 1943